United States Patent Office
3,231,616
Patented Jan. 25, 1966

3,231,616
PRODUCTION OF AROMATIC AMINES BY
AMMONOLYSIS
Daniel G. Jones, Cherry Hill, N.J., assignor to Socony
Mobil Oil Company, Inc., a corporation of New York
No Drawing. Filed Feb. 26, 1963, Ser. No. 261,218
15 Claims. (Cl. 260—581)

This invention relates to the formation of aromatic amines in the presence of an alumino-silicate having unique catalytic activity and, in particular, the production of aromatic amines by ammonolysis in the presence of these aluminosilicate catalysts.

Both naturally occurring and synthetic alumino-silicates have been found to exhibit catalytic activity in the conversion of hydrocarbons. These alumino-silicates, known broadly as zeolites, have ordered internal structures which form internal passages, pores, or cavities of definite ranges of size. Because the dimensions of these pores serve to accept for adsorption, hydrocarbon molecules of certain dimensions and reject those of larger dimension, these materials have been referred to as "molecular sieves" and are utilized so that advantage may be taken of these properties.

This invention contemplates the formation of aromatic amines by reacting substituted aromatic hydrocarbons with ammonia in the presence of metal exchanged synthetic or naturally occurring alumino-silicates having an ordered internal structure with active cation sites therein. These sites are produced by cation exchange of the alkali or alkaline earth metal ions within the structure of the alumino-silicate with metallic ions; preferably those formed from metals which will form Werner complexes. Also the production of aromatic amines, such as aniline, can be carried out under continuous vapor phase operation and the by-products formed during the catalytic reaction may be separated in an easy and simple manner by fractional distillation. In addition, this process for the catalytic reaction may be carried out under atmospheric pressure thus providing an economical and simplified method of producing aromatic amines.

Advantageously, the substituted aromatic compounds to be aminated include a group capable of reacting with the ammonia in the presence of the alumino-silicate catalyst. For example, the substituent groups such as the halogen, hydroxyl, sulfhydryl, sulfos and the like, all have been found exertmely effective in producing aromatic amines when reacted with ammonia in the presence of the alumino-silicate catalyst. In addition, aromatic hydrocarbon moiety of the reactant may be benzene, naphthalene, anthracene, or other like ring structures of these hydrocarbons. Also, the hydrocarbon ring may be substituted by more than one of the groups capable of reaction with the ammonia during the catalytic conversion of the substituted aromatic compounds to aromatic amines. For example, halogeno-aromatics including those having mono- and poly-substituted chloro and bromo groups can be readily aminated to aryl amines such as aniline, toluidine, xylylamine, and the like, by contacting a reaction mixture of one of said substituted aromatics and gaseous ammonia with a metal exchanged alumino-silicate catalyst of this invention. In general, the substituted aromatic should have at least one reactive substituent attached to the nucleus of its aromatic ring structure.

Advantageously, the ammonia may be introduced into this process in an ammonia containing medium. This medium may consist of different forms of substantially pure ammonia or ammonia dispersed in an inert carrier. For example, substantially pure gaseous ammonia, gaseous ammonia mixed with inert gases, liquid ammonia, aqueous ammonium solutions, or ammonia dissolved in organic solvents, can be effectively utilized in accordance with this invention.

Preferably, gaseous ammonia either with or without an inert gas is employed because of its ease of handling and adaptability for process control at the operating conditions contemplated by this invention. The use of gaseous anyhdrous ammonia allows continuous operation and substantially eliminates the formation of phenols and other hydrolyzed by-products which are formed by the use of aqueous ammonia solutions during the ammonolysis of certain substituted aromatics. It will be understood that when operating at elevated temperatures under anhydrous conditions, the ammonia reactant will be a gas because of its relative low critical temperature (132.30 C.).

When operating under low temperatures and relatively high pressures, aqueous ammonia solutions may be used as a source of the ammonia reactants. However, because the partial pressure of ammonia in an aqueous solution at a given concentration does not increase as rapidly as the water vapor pressure when the temperature is increased, it is desirable to employ a high molar concentration of ammonia so that hydrolysis of the reactants and products is minimized.

It will be appreciated that the particular ammonia containing medium used is determined by the temperature and pressure conditions required for a specific ammonolysis reaction, the activity of the catalyst, the stability and solubility of the aromatics to be aminated, and the desired distribution of aromatic amines.

Advantageously it has been found that because of the unique activity shown by the alumino-silicate catalysts of this invention, aromatic amines may be produced by a continuous vapor phase process operated at atmospheric pressure. Such operating conditions promote the recovery of high yields of aromatic amines and also eliminate many of the problems heretofore attendant to their production, i.e., corrosion of equipment, necessity for high pressure equipment, production of less desirable by-products, ease of separation of products and by-products, and frequent replacement and regeneration of the catalyst.

The products formed during the process of this invention are readily condensed and collected. Then the aromatic amines may be easily separated from the unreacted substituted aromatic hydrocarbon and other by-product formed by fractional distillation.

The temperature employed in the production of aromatic amines by the process of this invention, will depend on the type of phase under which the reaction takes place and when a vapor phase is used, the temperature must exceed the critical temperature of the least volatile reactant. Specific operating temperatures, however, are dependent on the particular substituted aromatic hydrocarbons selected to be aminated, the phase condition to be maintained during the reaction and the alumino-silicate catalyst being employed. It will be appreciated that the temperature must not exceed that temperature at which the cell structure of the catalyst will collapse and thereby make the catalyst ineffective.

For example, the halogeno-aromatics, e.g., chlorobenzene, usually require higher operating temperatures because salts such as ammonium chloride are formed as reaction products during the ammonolysis reaction. These halogen salts undergo sublimation rather than the conventional change of state from solid to liquid. Because these salts have high sublimation temperatures, solid deposits will form on the catalysts and surfaces of the reaction zone at lower temperatures. Both the unique activity and the life of the catalysts are reduced by such deposits. Accordingly, when an aromatic amine is produced from chlorobenzene, or the like, the operating temperatures are preferably above 300° C. When reacting other substituted aromatics such as the phenols and the mercaptans, the process may operate at lower temperatures.

Also, the upper temperature limitations for the production of aromatic amines are governed by the temperatures at which the reactants or the reaction products undergo degradation or otherwise form less desirable by-products. In the present process, it has been found that the amount of unsubstituted aromatic hydrocarbons significantly increases at higher temperatures. Consequently, there is a proportional decrease in the amounts of unreacted substituted aromatics or aromatic amines found in the reaction products. It is believed that this change in product distribution is caused by hydrogenation of both the substituted aromatic and the aromatic amines as well as a loss in catalyst activity. Apparently, liberated hydrogen produced by the decomposition of ammonia reduces the metal ions exchanged with the alumino-silicate catalyst. This reduction produces elemental metal particles at the active sites within the catalyst which may catalyze the hydrogenation of the reactants and/or reaction products with the liberated hydrogen. Therefore, the upper range of operating temperatures for this process is dependent on the temperatures required to reduce the exchanged ions with hydrogen at the other reaction conditions of the process.

The pressures under which the ammonolysis reactions of this process are carried out may extend from atmospheric to several atmospheres. At elevated pressures, the conversion to aromatic amines may be increased and the decomposition of ammonia reduced. However, elevated pressures tend to aggravate the problem created by sublimation of ammonium salts. Accordingly, when reacting halogeno-aromatics, such as chlorobenzene, with ammonia over an alumino-silicate catalyst as set forth in this invention to form aniline, the operating pressures are preferably atmospheric and the reaction conducted in the vapor phase. It will be appreciated, however, that the choice of pressure is determined by the phase relationship of reactants required to produce a desired distribution of aromatic amines in the presence of a particular metal cation exchanged alumino-silicate catalyst.

The relative molar proportion of the reactants may vary over a wide range. In general, the ammonia in the reaction mixture is in excess to that of the substituted aromatic compound. However, it has been found that good results can be obtained by the process of this invention when the molar ratio of the ammonia to the substituted aromatic hydrocarbon is as low as about 2 to 1. In the formation of aniline by the reaction of chlorobenzene with ammonia over the alumino-silicate catalyst of this invention, the preferred reaction of ammonia to chlorobenzene is about 8 to 1.

Exemplary of the catalysts used in this invention are alumino-silicates which have their ionizable metal cation exchanged. Typical of these are the natural and synthetic alumino-silicates having an ordered internal structure of a defined pore size of greater than 6 A. and generally from 6 A. to 15 A. These alumino-silicates can be described as a three dimensional framework of $SiO_4$ and $AlO_4$ tetrahedra in which the tetrahedra are cross linked by the sharing of oxygen atoms whereby the ratio of the total aluminum and silicon atoms to oxygen atoms is 1:2. In their hydrated form, the alumino-silicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any or more of a number of metal ions depending on whether the alumino-silicate is synthesized or occurs naturally. Typical cations include sodium, lithium, potassium and calcium. Although the proportions of inorganic oxides in the silicates and their spatial arrangement may vary, effecting distinct properties in the alumino-silicates, the two main characteristics of these materials are the presence in their molecular structure of at least 0.5 equivalent of an ion of positive valence per gram atom of aluminum, and an ability to undergo dehydration without substantially effecting the $SiO_4$ and $Al_4$ framework.

One of the crystalline alumino-silicates utilized by the present invention is the synthetic zeolite designated as zeolite X, and is represented in terms of mole ratios of oxides as follows:

$$1.0\pm0.2M_2O:Al_2O_3:2.5\pm0.5SiO_2:YH_2O$$

wherein M is a cation having a valence of not more than 3, $n$ represents the valence of M, and Y is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

zeolite X is commercially available in both the sodium and the calcium forms; the former being preferred for the purposes of this invention. It will be appreciated that the crystalline structure of zeolite X is different from a number of other zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic zeolite, having the same crystalline structure as zeolite X and designed as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9\pm0.2Na_2O:Al_2O_3WSiO_2:XH_2O$$

Wherein "W" is a value greater than 3 up to about 5 and "X" may be a value up to about 9.

The selectivity of zeolite Y for larger molecules is appreciably the same as zeolite X because its pore size extends from 10 A. to 13 A.

Another alumino-silicate material found to be active in the present amination process is a naturally occurring zeolite known as mordenite. This zeolite is an ordered crystalline structure having a ratio of silicon atoms to aluminum atoms of about 5 to 1. In its natural state it usualy appears as the sodium salt which is represented by the following formula:

$$Na_8(AlO_2)_8(SiO_2)_{40}24H_2O$$

Mordenite differs from other known zeolites in that ordered crystalline structure is made up of chains of 5-membered rings of tetrahedra and is adsorbability suggests a parallel system of channels having free diameters on the order of 4 A. to 6.6 A., interconnected by smaller channels, parallel to another axis, on the order of 2.8 A., free diameters. As a result of this different crystalline framework, mordenite can adsorb simple cyclic hydrocarbons, but cannot accept the large molecules which will be adsorbed by zeolite X and zeolite Y. As a consequence of this smaller pore size it has been found that mordenite will be more rapidly deactivated than either zeolite X or zeolite Y at the operating conditions of the present process.

It will be appreciated that other alumino-silicates can be employed as catalysts for the production of aromatic amines. Exemplary of the naturally occurring zeolites which may be used are: faujasite, heulandite, clinoptilolite, and dachiardite.

A criterion for the alumino-silicate to be employed as a catalyst is that its ordered internal structure should have defined pore sizes of sufficient diameters, after being exchanged with cations as heretofore described, to allow entry of the reactants and the formation of the desired aromatic amines. In addition, the alumino-silicate catalyst should have an ordered internal structure which is capable of chemisorbing or ionically bonding any additional cations that will replace sodium or the like to increase its catalytic activity for the ammonolysis reactions contemplated by this invention.

The preferred alumino-silicate catalyst contemplated herein for the amination of substituted aromatic compounds by ammonolysis is prepared from the sodium form of zeolite X as the result of a treatment involving replacement of the sodium by contact with a fluid medium containing cations of copper. Any medium which will ionize the copper without effecting the crystalline structure of the zeolite may be employed. After such treatment the resulting exchanged product is water washed, dried and dehydrated. The dehydration thereby producing the characteristic system of open pores, passages or cavities of crystalline alumino-silicates. As a result of the above treatment the copper exchanged alumino-silicate is a crystalline catalyst having active sites within its ordered internal structure. These sites are produced by the copper ions chemisorbed or ionically bonded thereto.

It will be appreciated that metallic cations other than copper may be exchanged with ionizable metal in the alumino-silicates to form catalysts having high activity for ammonolysis of substituted aromatic hydrocarbons. Typical of such cations are mercury, silver, platinum, gold, iron, zinc, cobalt, nickel, and those formed from the rare earth metals, and the like. In particular, the metals such as those found in Groups IB, IIB, VB, VIB, and VIII of the Periodic Table of Elements produce catalysts of varying degrees of high activity when cation exchanged with the ionizable metal of the alumino-silicates heretofore described.

Also, it has been found that cations of metals which form Werner complexes when exchanged with the ionizable metal in the alumino-silicates produce highly active catalyst for the process of this invention. It is believed that the unique activity shown by the alumino-silicate catalysts may be attributed to the ability of the exchanged metals to form Werner complexes. When the ions of these metals are cation exchanged with the alumino-silicates, active sites are formed where the ions are bonded to the alumino-silicate. These active sites exhibit a complexing mechanism similar to that shown by the coordination bonding of Werner complexes. It is believed that this complexing mechanism causes the ammonia to form a Werner-type complex at the active sites. This complex would be likened to the coordination compounds known as ammines which are formed by the union of ammonia with a metallic substance wherein the nitrogen atoms are linked directly to the metal atom. Apparently, this ammine-type complex is highly reactive with the substituent groups attached to the aromatic nucleus and it is believed that the complex gives up an amino group to form amines from the substituted aromatic compounds.

In accordance with this invention, the unique activity of the alumino-silicate catalyst is also affected by the availability of the active sites within its ordered internal structure. It will be appreciated that the pore sizes of the catalysts determine whether a compound of specific molecular dimensions can contact the active sites by passing through its ordered internal structure. Accordingly, catalysts having a larger pore size effectively promote ammonolysis for a greater range of different aromatic compounds. In addition, the rate of deactivation of the catalyst, as exemplified by the longer life of zeolite X when compared with exchanged mordenite, is substantially affected by the pore size. Apparently, larger pore sizes allow the reactants to pass more freely through the ordered internal structure; thereby facilitating shorter contact times which prevent product degradation. Furthermore, larger pore sizes accommodate greater accumulation of tarry residues before becoming blocked and deactivated.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates may feasibly be prepared as described in copending application of Albert B. Schwartz, Serial No. 147,722 filed October 26, 1961, by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the periodic table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl orthosilicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of 1/16" to 1/8" size, for example, obtained upon pelleting the alumino-silicate with a suitable binder such as clay. The commercially available zeolite material, described hereinabove, may be obtained on a clay-free basis or in the form of pellets in which clay is present as a binder.

It will also be appreciated that the operating conditions employed by the present invention will be dependent on the specific ammonolysis reaction being effected. Such conditions as temperature, pressure, space velocity and molar ratio of the reactants and the presence of inert diluents will have important effects on the process. Accordingly, the manner in which conditions affect not only the conversion and distribution of the resulting aminated products but also the activity of the catalyst will be described below.

The process of the invention may be more readily understood by reference to the following examples of specific ammonolysis reactions. In each example the reaction was carried out by passing the reactants through a 20X 1.5 cm. Vycor reactor with a 6 mm. thermowell extending throughout the length of the reactor. The reactor was packed with 10 ml. of the alumino-silicate catalyst and provided with a preheater section of a 2 to 3 cm. bed of alumina chips. The reactor was wrapped with a resistance wire and insulated with asbestos tape and aluminum foil to provide heat to it. The temperature in the reactor was controlled by varying the heat input through the resistance wire by means of a variable transformer. Chlorobenzene was fed by means of a concentrate syringe pumped into the reactor and ammonia was pumped into the reactor with its throughput rate measured by a rotometer to maintain the desired ratio of ammonia to chlorobenzene. The reactants, chlorobenzene and ammonia, were passed over the heated catalyst bed.

The alumino-silicate catalysts employed in these reactions were Linde 13X molecular sieve pellets containing 20% by weight clay of a binder. The molecular sieve portion of these pellets being a zeolite X material having a pore size of about 10 A. and having a predetermined percentage of its sodium ions replaced on an equivalent basis by cation exchange with a metal ion in an aqueous solution of the salt of the metal.

The product exiting from the reactor was passed through a water condenser and receiver which were immersed in ice water to condense the product and this condensed product was analyzed by vapor phase chromatography to determine the percent by weight of the various materials formed from the chlorobenzene. The analysis was verified by infrared spectroscopy.

EXAMPLE I

*Ammonolysis of chlorobenzene using copper exchanged zeolite X*

A 10 ml. sample of an alumino-silicate catalyst as described above was charged into the reactor. The catalyst has 41 percent of its sodium ions cation exchanged with copper on an equivalent basis. In accordance with the reaction procedure set forth above, ammonia was introduced into the reactor and heated to 149° C. Then chlorobenzene was added and the reaction temperature raised step-wise to 460° C. while the reactor was maintained substantially at atmospheric pressure. The molar ratio between ammonia and chlorobenzene was 8:1, and the liquid hourly space velocity of the chlorobenzene was 1.3. The following results were observed by conducting a vapor phase chromatography test of the condensed products from the reactor at different temperatures.

PRODUCT COMPOSITION FROM REACTOR, WEIGHT PERCENT

| Temperature, ° C. | Aniline | Benzene | Chlorobenzene |
| --- | --- | --- | --- |
| 327 | 0.8 | 1.0 | 98.2 |
| 371 | 9.0 | 7.1 | 83.9 |
| 460 | 4.7 | 57.1 | 38.2 |

EXAMPLE II

*Ammonolysis of chlorobenzene using zinc exchanged zeolite X*

This run was repeated under the same conditions as employed in Example I. The catalyst employed was Linde 13X molecular sieve pellets in which the the alumino-silicate had been cation exchanged with zinc so that 43 percent of the sodium had been exchanged on an equivalent basis. The reaction temperature was raised step-wise at 566° C. Analysis of the products by vapor phase chromatography produced the following results:

PRODUCT COMPOSITION FROM REACTOR, WEIGHT PERCENT

| Temp., ° C. | Aniline | Dichlorobenzene | Benzene | Chlorobenzene |
| --- | --- | --- | --- | --- |
| 249 | None | | | 100.0 |
| 399 | 0.2 | | | 99.8 |
| 460 | 0.3 | Trace | 0.1 | 99.6 |
| 538 | 1.9 | 1.3 | 1.1 | 95.7 |
| 566 | 2.3 | 0.6 | 4.8 | 92.2 |

In Example I, the data shows that the conversion of chlorobenzene to aniline in the presence of the copper exchanged zeolite X is appreciably higher than that produced by the zinc exchanged zeolite X. It is believed that the difference in activity may be attributed to the ability of copper to form more stable Werner complexes than zinc.

In addition, it will be seen that the conversion to aniline reaches a maximum at about 371° C. and then drops off as the temperature is raised. Also, the amount of benzene begins to become significant at about 371° C. Apparently, the decrease in the amount of aniline is caused by the reduction of the chlorobenzene and/or the aniline to benzene. This increase in benzene at the high temperature may be the result of the reduction of the copper ions within the catalyst to elemental copper particles that effect the hydrogenation reactions.

Example II shows that the conversion of chlorobenzene to aniline increased with an increase in temperature; however, at temperatures of about 538° C., the percentage of benzene found in the condensed reaction products had increased.

EXAMPLE III

*Ammonolysis of chlorobenzene over copper exchanged zeolite X catalyst as affected by molar ratio of ammonia:chlorobenzene*

The effects on conversion produced by increasing the molar ratio between ammonia and chlorobenzene at a reaction temperature of 325° C. are illustrated by the following runs. In each run 10 ml. of a copper exchanged zeolite X catalyst identical to that employed in Example I were charged into the reactor. Then the reactor was raised to 325° C. and ammonia was introduced and allowed to presaturate the catalyst. After selected periods of ammonia pretreatment for each run, chlorobenzene at a liquid hourly space velocity of 1.35 was passed into the reactor together with the ammonia. During these runs the reactor was held at substantially atmospheric pressure, and samples of the product streams were taken each half hour and analyzed by vapor phase chromatography. As shown by the following data the rate of conversion of chlorobenzene to aniline more than doubled when the molar ratio between ammonia and chlorobenzene was increased from 1.9:1 to 7.6:1.

| Run | 1 | 2 | 3 |
|---|---|---|---|
| $NH_3$/chlorobenzene | 1.9 | 7.6 | 7.6 |
| $NH_3$ pretreat, min | 15 | 2 | 144 |
| Conversion to aniline (After the following time on stream, hrs.): | | | |
| 0.5 | 4.9 | 12.5 | 11.9 |
| 1.0 | 0.5 | 3.2 | 2.2 |
| 1.5 | 0.3 | 1.2 | 0.9 |
| 2.0 | 0.2 | 1.0 | 0.7 |

Comparison of the above data for the three runs immediately reveals that an increase in the amount of ammonia during the ammonolysis reaction promotes higher conversion of chlorobenzene to aniline. In addition, the activity of the catalyst remained appreciably greater at the higher molar ratio, although there was a substantial decrease in activity over the two hour runs due to the formation of coke.

Another interesting feature is that the catalyst pretreated with ammonia for more than two hours (Run 3) maintained substantially the same activity as the catalyst in Run 2 which was pretreated for two minutes. Thus, it is apparent that catalyst deactivation at 325° C. is not caused by ammonia dissociation and subsequent reduction of the copper within the catalyst.

It will also be noted that the conversion achieved at 325° C. during Run 1 at a low molar ratio of reactants of 1.9:1 was greater than that produced at 327° C. during the run conducted in Example I. Apparently, higher conversions are obtained when the catalyst is quickly raised to the desired operating temperature after being contacted with both ammonia and chlorobenzene, thereby reducing undue coke accumulation.

It will be understood that the degree of unique activity possessed by the catalyst does not necessarily correspond to the position of the exchanged metal in the electrochemical series, and that cations of metals below hydrogen in the series may be employed to prepare the catalysts of this invention.

It will be appreciated that the specific examples enumerated above are merely illustrative of the types of substituted aromatics which may be aminated in accordance with the process of the invention and that other aromatics including those containing alkyl groups and those in the naphthalene and anthracene series may be aminated in the presence of the alumino-silicate catalysts of this invention.

It will also be appreciated that the operating conditions for the ammonolysis reactions in accordance with the process of this invention, as exemplified in the foregoing examples and discussion thereof, may be varied so that the process can be conducted in gaseous phase, liquid phase, or mixed liquid-vapor phase, depending on product distribution, degree of amination, rate of catalyst deactivation, and operating pressures and temperatures; and that various modifications and alterations may be made in the process of this invention without departing from the spirit of the invention; and that these examples are for illustration purposes and are not to be considered limiting of the invention herein.

What is claimed is:

1. A process for producing aromatic amines by ammonolysis of substituted aromatic compounds which comprises effecting reaction of a substituted aromatic hydrocarbon having a ring moiety selected from the group consisting of benzene, naphthalene, anthracene, and lower alkyl derivatives thereof, and having a substituent group selected from the class consisting of halogeno, hydroxyl, sulfhydryl, and sulfo, with ammonia at a temperature of from about 300° C. to about 600° C. in the presence of a catalytic composition comprising an alumino-silicate zeolite having a portion of its ionizable metal cation exchanged with another metal and having a defined pore size of greater than about 6 A. within an ordered internal structure.

2. A process for producing aromatic amines by ammonolysis of substituted aromatic compounds which comprises effecting reaction of a substituted aromatic hydrocarbon having a ring moiety selected from the group consisting of benzene, naphthalene, anthracene, and lower alkyl derivatives thereof, and having a substituent group selected from the class consisting of halogeno, hydroxyl, sulhydryl, and sulfo, with ammonia at a temperature of from about 300° C. to about 600° C. in the presence of a catalyst consisting essentially of an alumino-silicate zeolite having a portion of its ionizable metal cation exchanged with another metal and having a defined pore size of from about 6 A. to about 13 A. within an ordered internal structure.

3. The process of claim 1 in which said aluminosilicate catalyst is cation exchanged with at least one metal selected from the group consisting of Groups IB, IIB, VB, VIB, and VIII of the periodic table.

4. The process of claim 3 in which said alumino-silicate catalyst is cation exchanged with at least one metal capable of forming Werner complexes.

5. The process of claim 1 in which said alumino-silicate catalyst is cation exchanged with copper.

6. The process of claim 1 in which said alumino-silicate catalyst is a metallic cation exchanged mordenite.

7. The process of claim 1 in which the catalyst is cation exchanged with zinc.

8. The process of claim 1 in which the reaction is conducted in the vapor phase.

9. The process of claim 1 in which the reaction is conducted at atmospheric pressure.

10. The process of claim 1 in which the molar ratio of the ammonia to said substituted aromatic compound is at least 2 to 1.

11. The process of claim 1 in which the aluminosilicate is in finely divided form and dispersed through a matrix binder.

12. A process for producing aniline which comprises effecting reaction of chlorobenzene and ammonia in the vapor phase at a temperature from about 300° C. to about 500° C. and at atmospheric pressure in the presence of a catalyst comprising an alkali metal alumino-silicate having a portion of its ionizable metal exchanged with copper and having a defined pore size of greater than 6 A. within an ordered internal structure; and recovering a reaction product containing aniline.

13. The process of claim 12 in which the copper in said catalyst has replaced from 30 to 50 percent of the alkali metal on an equivalent basis.

14. A process for producing aniline which comprises effecting reaction of chlorobenzene and ammonia at a temperature from about 300° C. to about 500° C. and at atmospheric pressure in the vapor phase in the presence of a catalyst comprising an alkali metal alumino-silicate having a portion of its ionizable metal exchanged with zinc and having a defined pore size of greater than about 6 A. within an ordered internal structure; and recovering a reaction product containing aniline.

15. The process of claim 14 in which the zinc in said catalyst has replaced from 30 to 50 percent of the alkali metal on an equivalent basis.

References Cited by the Examiner

UNITED STATES PATENTS

| 1,920,795 | 8/1933 | Jaeger | 252—455 XR |
| 2,948,755 | 8/1960 | Schmerling | 260—581 |
| 2,967,159 | 1/1961 | Gladrow et al. | 252—455 |
| 2,971,904 | 2/1961 | Gladrow et al. | 252—455 XR |

CHARLES B. PARKER, *Primary Examiner.*